US012600060B2

(12) United States Patent
Ill et al.

(10) Patent No.: US 12,600,060 B2
(45) Date of Patent: Apr. 14, 2026

(54) DEVICE FOR PRODUCING AND CONDITIONING A MULTI-COMPONENT MIXTURE AND METHOD FOR OPERATING A DEVICE OF THIS KIND

(71) Applicant: Henkel AG & Co. KGaA, Duesseldorf (DE)

(72) Inventors: Bernhard Ill, Hohenweiler (AT); Mario Metzler, Goetzis (AT); Christian Schwabl, Bregenz (AT)

(73) Assignee: Henkel AG & Co. KGaA, Duesseldorf (DE)

( * ) Notice: Subject to any disclaimer, the term of this patent is extended or adjusted under 35 U.S.C. 154(b) by 911 days.

(21) Appl. No.: 17/543,390

(22) Filed: Dec. 6, 2021

(65) Prior Publication Data

US 2022/0088829 A1        Mar. 24, 2022

Related U.S. Application Data

(63) Continuation of application No. PCT/EP2020/065919, filed on Jun. 9, 2020.

(30) Foreign Application Priority Data

Jun. 11, 2019      (DE) ......................... 102019208475.3

(51) Int. Cl.
*B01F 35/75*            (2022.01)
*B01F 27/806*            (2022.01)
(Continued)

(52) U.S. Cl.
CPC ............ *B29B 7/728* (2013.01); *B01F 27/806* (2022.01); *B01F 35/752* (2022.01); *B29B 7/401* (2013.01);
(Continued)

(58) Field of Classification Search
CPC ...... B29B 7/26; B29B 7/582; B01F 35/75471
(Continued)

(56) References Cited

U.S. PATENT DOCUMENTS

| | | | |
|---|---|---|---|
| 172,068 A | 1/1876 | Babbitt |
| 1,156,851 A | 10/1915 | Leroy |

(Continued)

FOREIGN PATENT DOCUMENTS

| | | |
|---|---|---|
| AT | 517337 A4 | 1/2017 |
| DE | 626344 C | 2/1936 |

(Continued)

OTHER PUBLICATIONS

International Search Report for PCT/EP2020/065917 mailed Sep. 10, 2020.

(Continued)

*Primary Examiner* — David L Sorkin
(74) *Attorney, Agent, or Firm* — Mary K. Cameron

(57)            ABSTRACT

The invention relates to a device for producing and processing a multi-component mixture, the device comprising a mixing chamber which has an outlet, wherein the device has a closure element which can be moved in the direction of a longitudinal axis L of the mixing chamber in order to open or close the outlet of the mixing chamber; wherein the device has an apparatus for controlling an axial speed of the closure element, the apparatus comprising: a hydraulic system in which a hydraulic fluid is guided; a cylinder which is connected to the nozzle closure element and cooperates with at least one chamber of the hydraulic system; and a controllable throttle gap arranged in the hydraulic system.

10 Claims, 2 Drawing Sheets

Figure 1:
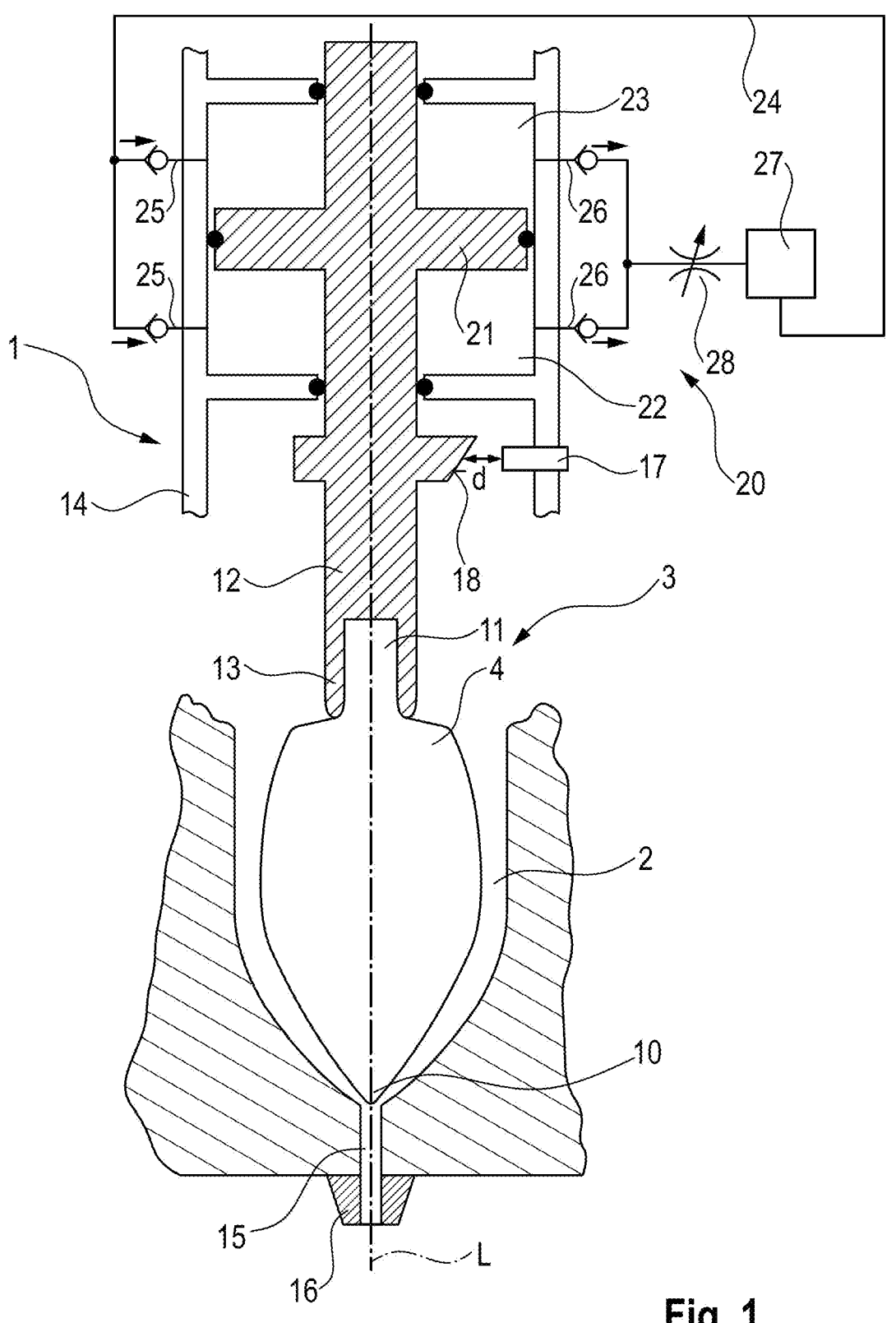

(51) Int. Cl.

| | | |
|---|---|---|
| *B29B 7/40* | (2006.01) | |
| *B29B 7/58* | (2006.01) | |
| *B29B 7/72* | (2006.01) | |
| *B01F 101/00* | (2022.01) | |

(52) U.S. Cl.

CPC .............. *B29B 7/407* (2013.01); *B29B 7/582* (2013.01); *B01F 2101/2805* (2022.01)

(58) Field of Classification Search

USPC .................................. 366/78, 192, 193, 289

See application file for complete search history.

(56) References Cited

U.S. PATENT DOCUMENTS

| | | | |
|---|---|---|---|
| 1,587,840 A | | 6/1926 | Kilmer |
| 1,667,944 A | | 5/1928 | Nichols |
| 2,004,009 A | | 6/1935 | Moir |
| 2,687,830 A | | 8/1954 | Doering |
| 3,165,785 A | * | 1/1965 | Hehl .................. B29C 45/5008 |
| | | | 425/585 |
| 3,182,971 A | * | 5/1965 | Wakeman .......... B01F 25/4413 |
| | | | 251/26 |
| 3,241,606 A | | 3/1966 | Honjo et al. |
| 3,310,836 A | | 3/1967 | Nichols |
| 3,887,170 A | * | 6/1975 | Heindl .................... B29C 45/07 |
| | | | 366/78 |
| 4,067,553 A | | 1/1978 | Yamaoka |
| 4,142,805 A | | 3/1979 | Tadmor |
| 4,183,676 A | | 1/1980 | Engels et al. |
| 5,180,225 A | | 1/1993 | Piccolo et al. |
| 5,723,079 A | * | 3/1998 | Fujita .................... B29C 45/77 |
| | | | 425/149 |
| 5,750,014 A | | 5/1998 | Stadler et al. |
| 5,843,489 A | | 12/1998 | Nakano |

| | | | |
|---|---|---|---|
| 5,925,295 A | * | 7/1999 | Nakamura .............. B29C 45/50 |
| | | | 425/557 |
| 6,126,808 A | | 10/2000 | Rasmussen |
| 6,592,249 B1 | | 7/2003 | Hausbichler et al. |
| 7,540,651 B2 | | 6/2009 | Matsumoto et al. |
| 8,047,519 B2 | | 11/2011 | Rienecker |
| 2005/0255015 A1 | | 11/2005 | Le |
| 2015/0165403 A1 | * | 6/2015 | Lutz .................. B01F 35/22162 |
| | | | 366/160.1 |

FOREIGN PATENT DOCUMENTS

| | | |
|---|---|---|
| DE | 100400 A5 | 9/1973 |
| DE | 3210978 A1 | 9/1983 |
| DE | 3304129 A1 | 8/1984 |
| DE | 4235850.7 A1 | 4/1994 |
| DE | 29723102 U1 | 3/1998 |
| DE | 29819785 U1 | 1/1999 |
| DE | 19848357 A1 | 4/2000 |
| DE | 202005011120 U1 | 9/2005 |
| DE | 102012002047 A1 | 9/2012 |
| DE | 102012103885 A1 | 11/2013 |
| DE | 202017103837 U1 | 10/2018 |
| EP | 0328154 A1 | 8/1989 |
| JP | H03288612 A | 12/1991 |
| JP | H03288613 A | 12/1991 |
| JP | H0631724 A | 2/1994 |
| JP | 2019039527 A | 3/2019 |
| WO | 2007124728 A2 | 11/2007 |
| WO | 2017004637 A1 | 1/2017 |
| WO | 2017004641 A1 | 1/2017 |

OTHER PUBLICATIONS

International Search Report for PCT/EP2020/065919 mailed Sep. 10, 2020.

* cited by examiner

DEVICE FOR PRODUCING AND CONDITIONING A MULTI-COMPONENT MIXTURE AND METHOD FOR OPERATING A DEVICE OF THIS KIND

The invention relates to a device for producing and processing a multi-component mixture, the device comprising a mixing chamber and a mixing device, wherein the mixing device can have a stirrer which is arranged in the mixing chamber and is rotatably driven about an axis of rotation. It also relates to a method for operating such a device.

DE 10 2012 103 885 A1 discloses a device for producing a multi-component mixture, wherein the mixing chamber can be rinsed and the temperature of said chamber can be controlled by means of water channels embedded in the chamber wall.

Mixing devices of this type are used to mix a number of components of a plastics mixture together immediately before use and make them available for processing. For example, the mixing chamber can have an outlet which is provided with a nozzle and through which a strand of the finished mixture can be dispensed in a metered manner and applied to a surface, for example by means of a robot arm.

The problem with this is that displacement effects occur in the mixing chamber as a result of the opening and closing of the nozzle. These effects make it more difficult to process the mixture cleanly and precisely, for example make it more difficult to optimally couple between a start and an end of a sealing bead.

The object of the invention is therefore to provide a device for producing and processing a multi-component mixture by means of which particularly precise processing and in particular particularly precise dispensing of the mixture is possible. A method for operating such a device is also to be provided.

This object is achieved by means of the subject matter of claims 1 and 10. Further embodiments and advantageous designs are found in the dependent claims.

According to one aspect of the invention, a device for producing and processing a multi-component mixture is specified, the device comprising a mixing chamber which has an outlet, wherein the device has a closure element which can be moved in the direction of a longitudinal axis L of the mixing chamber in order to open or close the outlet of the mixing chamber. The size of the axial gap between the closure element and the outlet is preferably in the range of from 0.3 mm to 3.5 mm, particularly preferably in a range of from 0.5 mm to 1.5 mm, during a metering process. Between metering processes, the size of the axial gap is preferably zero and the mixing chamber is preferably closed. The device comprises an apparatus for controlling an axial speed of the closure element, which apparatus comprises a hydraulic system in which a hydraulic fluid is guided. The apparatus also comprises a cylinder which is connected to the closure element and cooperates with a chamber of the hydraulic system or preferably cooperates with a first chamber and a second chamber of the hydraulic system. In addition, the apparatus comprises a controllable throttle gap arranged in the hydraulic system.

A nozzle into which the outlet opens is preferably provided. The closure element is preferably provided as a nozzle closure element which can be moved in the direction of a longitudinal axis L of the mixing chamber in order to open the nozzle and thus the outlet of the mixing chamber.

The hydraulic system is preferably designed as a hydraulic circuit.

A double-acting cylinder is preferably used as the cylinder.

The closure element can in particular be arranged within the mixing chamber and can be designed, for example, as part of a stirrer of the device, which stirrer is rotatably arranged on a central shaft.

When using a stirrer, its speed is preferably adjustable. The speed of the stirrer can particularly preferably be set to a value between 1 rpm and 6000 rpm. It can very particularly preferably be set to a value between 800 rpm and 3000 rpm.

The pressure in the mixing chamber is preferably in a range between 0.5 bar and 4.0 bar, preferably in a range between 1.5 bar and 3.0 bar. However, applications can also be considered in which a pressure of up to 50 bar prevails in the mixing chamber, and so the mixing chamber is preferably designed so as to withstand an internal pressure which has a value in a range between 0.5 bar and 50 bar.

The device is advantageous in that displacement effects when opening and closing the outlet can be minimized by controlling the axial speed of the closure element. In particular, an axial movement of the closure element can be braked shortly before reaching its end positions, in particular before reaching its closed position. The speed is controlled in a particularly simple manner by means of a hydraulic brake in the form of a controllable throttle gap. If the closure element is designed as part of a stirrer of the device, the preferably double-acting cylinder can be arranged on a drive shaft of the stirrer. Controlling the speed, and in particular throttling the speed in the case of a power-driven movement of the stirrer, has proven to be particularly advantageous. In this case, pneumatic actuation of the stirrer by means of a pneumatic cylinder is conceivable for said movement. The time required for the movement of the closure element to close the outlet, i.e. the travel time of the closure element from its initial position to reaching the closed position, can preferably be lengthened by a factor in the range of from 2 to 10 by means of the throttling. It is conceivable, for example, that the regular travel time of the closure element could be 10 ms without throttling. The throttling could, however, extend it by a factor of from 5 to 50 ms, for example, which could have a positive effect on the process. The speed of the closure element is preferably in a range from 10 mm/s to approximately 100 mm/s.

If the closure element moves away from and thus opens the outlet, the pressure of the hydraulic fluid held in the chamber located remotely from the outlet is increased and the hydraulic fluid flows through an outlet of this chamber into the hydraulic system, while the pressure of the hydraulic fluid held in the chamber near to the outlet reduces and hydraulic fluid subsequently flows out of the hydraulic system into this chamber. In this case, depending on the width of the controllable throttle gap in the hydraulic system, hydraulic fluid flows in and out in a throttled manner.

The controllable throttle gap can in particular be designed to be pneumatically controllable.

In particular, a throttle apparatus comprising the throttle gap can comprise a needle which is axially movable in order to set and, for example, open or close the throttle gap, wherein the needle can be moved by a resulting force from a pneumatic pressure and a spring force.

In this particularly simple and robust embodiment, a needle loaded by a spring is provided, wherein the pretensioning and arrangement of the spring is selected in particular such that the throttle gap is completely opened without a pneumatic pressure acting against the spring force. If, however, a pneumatic force acts on the needle counter to the spring force, the throttle gap is moved in the direction of a closed position.

This embodiment is advantageous in that the pneumatic control can take place very precisely and quickly.

The spring of the throttle apparatus can in particular be designed as a wave spring which preloads the needle into an open position. A wave spring is advantageous in that it requires relatively little installation space. Alternatively, a spiral spring could also be used, for example.

According to one embodiment, the throttle apparatus has a membrane connected to the needle, via which membrane a pneumatic pressure acts on the needle. The membrane is used in particular to separate the pneumatic circuit from the hydraulic system and allows the needle to be moved into the dry or wet region without leakage between these regions. The membrane can in particular be designed as a metal disk and can be clamped in a housing of the throttle apparatus. It is also conceivable to use a plastics material, in particular a fiber-reinforced plastics material, for the membrane. The use of a rubber material, in particular a fluororubber, which is preferably fiber-reinforced, has proven to be particularly advantageous. All of these types of membranes can also be clamped in a housing of the throttle apparatus.

The hydraulic system can have an equalizing tank which allows the volume of the hydraulic fluid to be equalized and facilitates the removal of gas bubbles from the hydraulic system.

In order to detect an axial position of the closure element, the device can comprise a sensor, for example an inductive sensor. The axial position of the closure element can then be used to control the speed of the closure element.

In a preferred embodiment, the device comprises suitable means for detecting or determining the travel speed for each movement of the closure element in order to control the movement of the closure element by means of a comparison with stored target values. For example, it is conceivable to use technical means for detecting the path and the time required for each movement of the closure element. The device is preferably connected to a computing unit or comprises such a computing unit, said computing unit comprising an algorithm which calculates the travel speed from the detected values and compares said speed with stored target values. The optimal throttle setting for the next movement is in turn calculated, by means of a control algorithm, from the deviation of the determined actual value from the stored target value. In the ideal case, a constant speed which is preferably identical to the target speed can be achieved over the entire travel path in this way.

According to one aspect of the invention, a method is specified for operating a device for producing and processing a multi-component mixture, which device comprises a mixing chamber which has an outlet, wherein the device has a closure element which can be moved in the direction of a longitudinal axis of the mixing chamber in order to open or close the outlet of the mixing chamber. The method comprises detecting an axial position of the closure element, for example by means of the aforementioned sensor, determining a braking requirement of the closure element on the basis of its axial position, and setting a throttle gap in a hydraulic system in such a way that a cylinder which is connected to the closure element and cooperates with a chamber of the hydraulic system or preferably cooperates with a first chamber and a second chamber of the hydraulic system is hydraulically throttled according to the determined braking requirement of the closure element.

In this case, a nozzle into which the outlet opens is preferably provided. The closure element is preferably provided as a nozzle closure element which can be moved in the direction of a longitudinal axis L of the mixing chamber in order to open the nozzle and thus the outlet of the mixing chamber.

The hydraulic system is preferably designed as a hydraulic circuit.

The cylinder is preferably a double acting cylinder.

In a preferred embodiment, suitable means for detecting or determining the travel speed for each movement of the closure element are provided in order to control the movement of the closure element by means of a comparison with stored target values. The use of a technical solution described above is also conceivable in this case, for example. In the ideal case, a constant speed which is preferably identical to the target speed can be achieved over the entire travel path by means of comparing actual values with target values and subsequently carrying out control. The speed of the closure element is preferably set to a value in a range from 10 mm/s to approximately 100 mm/s.

Alternatively, the method can also make it possible for the closure element to be braked in the vicinity of its end positions by hydraulic throttling. As a result, displacement effects in the mixing chamber can be reduced and the output of mixture from the outlet can be stabilized.

The throttle gap is set in particular pneumatically.

Embodiments of the invention are explained in more detail below with reference to schematic drawings.

Figure 2:
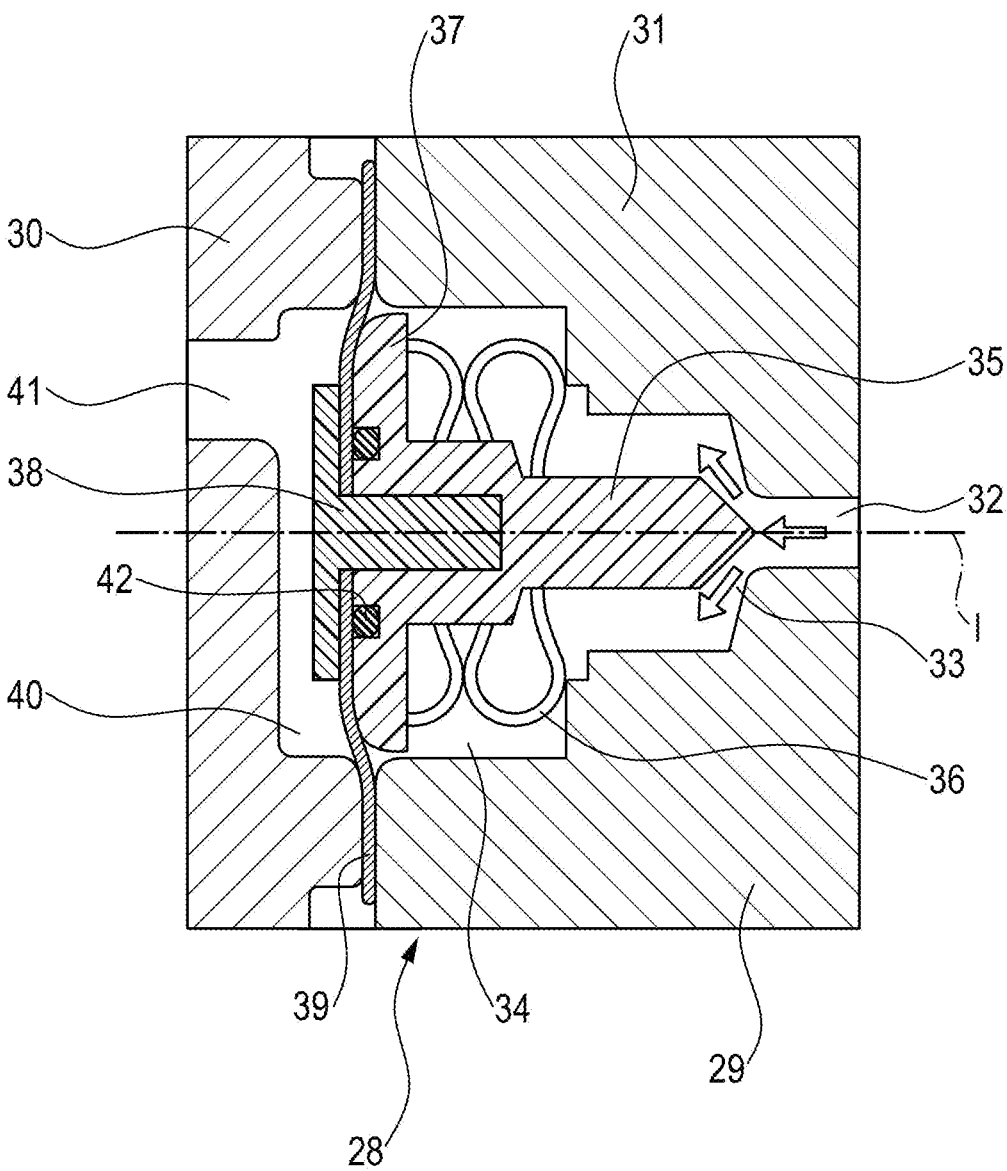

FIG. 1 shows a longitudinal section through a device for producing and processing a multi-component mixture according to an embodiment of the invention and FIG. 2 shows a longitudinal section through a throttle apparatus for the device according to FIG. 1.

FIG. 1 shows a device 1 for producing a multi-component mixture according to an embodiment of the invention, comprising a mixing chamber 2 and a mixing device 3. The mixing device 3 comprises a stirrer 4 which is arranged in the mixing chamber 2 and is rotatably driven about a longitudinal axis L by a shaft 12. The stirrer 4 is responsible for actively mixing together various components of a multi-component mixture, which components are introduced into the mixing chamber 2 through ducts (not shown). The multi-component mixture is in particular a plastics material.

The fully prepared multi-component mixture can be removed from the mixing chamber 2 through an outlet 15 provided with a nozzle 16. In the embodiment shown, the tip of the stirrer 4 is provided, as a closure element for the outlet 15, as a nozzle closure element 10 and is able to close and open the nozzle by the stirrer 4 being moved in the axial direction. The region of the mixing chamber 2 that delimits the outlet 15 and comes into contact with the nozzle closure element 10 is provided with a circumferential Teflon seal. The size of the axial gap between the nozzle closure element 10 and the outlet 15 is preferably in the range of from 0.5 mm to 1.5 mm during a metering process. Between metering processes, the size of the axial gap is zero and the mixing chamber is closed.

The stirrer 4 has an upper end 11 which is connected to a first end 13 of the shaft 12. The shaft 12 is rotatably mounted in a housing 14 (only shown in part) and has a cylinder 21 which is part of an apparatus 20 for controlling the axial speed of the nozzle closure element 10. In the preferred embodiment shown, a double-acting cylinder 21 is used which operates between a first chamber 22 and a second chamber 23 of a hydraulic system designed as a hydraulic circuit 24. The first chamber 22 has an inflow line 25 and an outflow line 26 which are both parts of the hydraulic circuit 24. The second chamber 23 likewise has an inflow line 25 and an outflow line 26. The inflow lines 25 and the outflow lines 26 are provided with corresponding non-return valves and are fluidically connected to an equalizing tank 27 of the hydraulic circuit 24. The equalizing tank 27 can have a relatively small volume, since the volume of the hydraulic fluid in principle remains constant.

In the embodiment shown, a controllable throttle 28 is arranged between the outflow lines 26 and the equalizing tank 27. A throttle 28 of this kind could, however, also be arranged at another point in the hydraulic circuit 24.

Low-viscosity oil or distilled water, for example, can be used as the hydraulic fluid in the hydraulic circuit 24.

The axial position of the shaft 12 and thus of the nozzle closure element 10 is determined by a sensor 17 which, in the embodiment shown, is designed as an inductive sensor and measures the distance d to the inclined surface 18.

FIG. 2 shows a throttle apparatus 29 which forms the throttle 28 and comprises a first housing part 30 and a second housing part 31, between which a membrane 39 which separates the throttle apparatus 29 into a chamber 34 and a chamber 40 is clamped. The chamber 34 in this case forms part of the hydraulic circuit 24 and the chamber 40 forms part of a pneumatic circuit (not shown in greater detail) for controlling the throttle 28.

A needle 35 is arranged in the chamber 34 which is connected to the hydraulic circuit 24 via an inlet 32, which needle can be moved in the direction of its longitudinal axis I in order to set and, for example, open or close a throttle gap 33. The needle 35 is preloaded into an open position of the throttle gap 33 by a wave spring 36.

In addition to the spring force exerted by the wave spring 36, which force is dependent on the selected spring stiffness, a pneumatic force also acts on the needle 35 as a result of the pressure prevailing in the chamber 40. For this purpose, the needle 35 is connected to the membrane 39 which is clamped between a needle head 37 and a cover 38 of the needle 35 in such a way that the membrane 39 carries the needle 35 with it when it is moved and the needle 35 remains movable in the direction of its longitudinal axis I. In addition, the needle 35 has a seal 42 in order to separate the chambers 34 and 40 from one another in a liquid-tight manner even when the membrane 39 connected to the needle 35 moves. The pressure in the chamber 40 can be controlled via an inlet 41 for compressed air.

The membrane 39 is therefore used both to transmit the pneumatic force to the needle 35 and to seal the two chambers 34, 40 against one another.

During operation, the axial position of the nozzle closure element 10 is measured by means of the sensor 17. A braking requirement for the nozzle closure element 10 is determined on the basis of this position and on the basis of a material output requirement for the device 1. Depending on the determined braking requirement, a pressure is generated in the chamber 40, which pressure, together with the spring force provided by the wave spring 36, sets the throttle gap 33 in order to throttle a movement of the nozzle closure element 10 in the desired manner.

If the nozzle closure element 10 moves from top to bottom in FIG. 1 and therefore into a closed position, the pressure of the hydraulic fluid in the first chamber 22 is increased and the fluid flows via the outflow lines 26 and via the throttle 28 into the equalizing tank 27. At the same time, the pressure of the hydraulic fluid in the second chamber 23 is reduced and hydraulic fluid flows in via the inflow line 25. Hydraulic fluid flows in and out in a manner throttled by the throttle 28.

The smaller the throttle gap 33, the stronger a braking effect on the axial speed of the nozzle closure element 10.

As a result of the throttling, the time required for moving the nozzle closure element 10 from the initial position of the nozzle closure element in order to close the outlet 15 can be increased. In the case of regular travel times, which can be for example in a range of from 8 ms to 20 ms, a travel time of the nozzle closure element 10 can be extended to 50 ms, for example. Depending on the path of the axial movement and the throttling, the speed of the closure element can be set to a value in a range of from 10 mm/s to approximately 100 mm/s.

In this way, the movement of the nozzle closure element 10 can be controlled in such a way that displacement effects within the mixing chamber 2 are minimized and uniform and controlled dispensing of mixture through the nozzle 16 is ensured. The control also makes it possible to compensate for interfering influences such as changes in the viscosity of the hydraulic fluid that depend on the system temperature.

LIST OF REFERENCE SIGNS

1 device
2 mixing chamber
3 mixing device
4 stirrer
10 nozzle closure element
11 upper end
12 shaft
13 first end
14 housing
15 outlet
16 nozzle
17 sensor
18 surface
20 apparatus
21 cylinder
22 first chamber
23 second chamber
24 hydraulic circuit
25 inflow line
26 outflow line
27 equalizing tank
28 throttle
29 throttle apparatus
30 housing part
31 housing part
32 inlet
33 throttle gap
34 chamber
35 needle
36 wave spring
37 needle head
38 cover
39 membrane
40 chamber
41 inlet
L axis of rotation
I longitudinal axis

What is claimed is:

1. A device for producing and processing a multi-component mixture, the device comprising:
a mixing chamber which has an outlet,
a closure element movable in a direction of a longitudinal axis L of the mixing chamber in order to open or close the outlet of the mixing chamber,

an apparatus for reducing an axial speed of the closure element during movement of the closure element towards the outlet of the mixing chamber, said apparatus comprising:

a hydraulic system in which a hydraulic fluid is guided;

a cylinder which is connected to the closure element and cooperates with at least one chamber of the hydraulic system; and a throttle apparatus comprising a controllable throttle gap arranged in the hydraulic system.

2. The device according to claim 1, wherein the cylinder is arranged on a drive shaft of the closure element.

3. The device according to claim 1, wherein the controllable throttle gap is pneumatically controllable.

4. The device according to claim 3, wherein the throttle apparatus comprises a needle which is axially movable in order to set the controllable throttle gap, wherein the needle can be moved by a resulting force from a pneumatic pressure and/or a spring force.

5. The device according to claim 4, wherein the throttle apparatus comprises a wave spring which preloads the needle into an open position.

6. The device according to claim 4, wherein the throttle apparatus has a membrane connected to the needle, wherein said membrane exerts pneumatic pressure on the needle.

7. The device according to claim 1, wherein the hydraulic system has an equalizing tank.

8. The device according to claim 1, further comprising a sensor for detecting an axial position of the closure element.

9. The device according to claim 1, wherein the closure element is part of a stirrer of the device.

10. A method for precise processing and dispensing of a multi-component mixture comprising:

processing a multi-component mixture in a device according to claim 1;

detecting an axial position of the closure element;

determining a braking requirement of the closure element;

setting the controllable throttle gap in the hydraulic system such that the cylinder is hydraulically throttled according to the determined braking requirement of the closure element thereby reducing displacement effects in the mixing chamber resulting from opening and closing of the outlet;

dispensing the mixture by opening and closing the outlet.

* * * * *